United States Patent [19]

Ebukuro et al.

[11] 3,904,872
[45] Sept. 9, 1975

[54] DETECTOR FOR LUMINESCENT PATTERNS COMPRISING A COLOR DETECTOR RESPONSIVE TO COLOR COMPONENTS OF PREDETERMINED COLORS OF THE LUMINESCENCE

[75] Inventors: Rinzou Ebukuro; Tomoyuki Isono; Tetsuo Omiya, all of Tokyo, Japan

[73] Assignee: Nippon Electric Company Limited, Tokyo, Japan

[22] Filed: Nov. 21, 1973

[21] Appl. No.: 417,839

Related U.S. Application Data

[63] Continuation-in-part of Ser. No. 210,907, Dec. 22, 1971, abandoned.

[30] Foreign Application Priority Data

Dec. 29, 1970  Japan.............................. 45-121098

[52] U.S. Cl. ................ 250/226; 250/363; 250/365; 250/367
[51] Int. Cl.² .......................................... G01J 3/34
[58] Field of Search ........... 250/226, 271, 363, 367, 250/366, 365

[56] References Cited
UNITED STATES PATENTS

| | | | |
|---|---|---|---|
| 3,412,245 | 11/1968 | Halverson .......................... | 250/271 |
| 3,483,388 | 12/1969 | Ogle et al. ......................... | 250/271 |
| 3,492,478 | 1/1970 | Smith ................................. | 250/271 |
| 3,560,758 | 2/1971 | Swanberg .......................... | 250/226 |
| 3,582,623 | 6/1971 | Rothery ............................. | 250/271 |
| 3,650,400 | 3/1972 | Warren .............................. | 250/365 |
| 3,663,813 | 5/1972 | Shaw ................................. | 250/271 |
| 3,666,946 | 5/1972 | Trimble ............................. | 250/271 |
| 3,670,169 | 6/1962 | Hogue ............................... | 250/226 |

*Primary Examiner*—James W. Lawrence
*Assistant Examiner*—B. C. Anderson
*Attorney, Agent, or Firm*—Sughrue, Rothwell, Mion, Zinn and Macpeak

[57] ABSTRACT

A pattern capable of emitting luminescence of at least one predetermined color is intermittently excited. The luminescence emitted thereby is subjected to color and intensity recognition and then to duration recognition to discriminate between fluorescence and phosphorescence of the predetermined color as well as to discriminate the fluorescence and phosphorescence of the pattern from spurious luminescence.

The color and intensity recognition is carried out by a small number of phototubes sensitive to the rays of more than one color component, one of the color components or one combination of the color components being the predetermined color of the luminescence, and by a color detector responsive to the output signals of the phototubes for producing logic signals corresponding to the detection of the color components and at least one combination of the color components, each logic signal assuming a preselected one of logic "1" and "0" levels when the intensity of the rays of the corresponding color component or the selected combination of the color components is above a predetermined magnitude.

4 Claims, 11 Drawing Figures

INVERTERS and AND GATES

DETECTOR FOR LUMINESCENT PATTERNS COMPRISING A COLOR DETECTOR RESPONSIVE TO COLOR COMPONENTS OF PREDETERMINED COLORS OF THE LUMINESCENCE

RELATED APPLICATIONS

This application is a continuation-in-part of application Ser. No. 210,907, filed Dec. 22, 1971 now abandoned.

BACKGROUND OF THE INVENTION

This invention relates to an electrooptical device for discriminating a pattern capable of emitting luminescence of at least one predetermined color from other patterns by subjecting a given pattern to intermittent excitation. The device is useful in discriminating between various postage stamps, securities, certificate stamps, and the like as well as in checking the aligning or register marks in multicolor printing.

Luminescence is classified into fluorescence and phosphorescence. The afterglow period of the former is about $10^{-5}$ seconds, while that of the latter is about $10^{-2}$ seconds or more.

It is known to apply to postage stamps, postage meter marks or indicia, government-imprinted stamps, stamped envelopes, and the like a luminescent tag capable of emitting a predetermined color to facilitate automatic mail handling. Recognition of such tags which have color phosphorescence capabilities has been carried out by exposing the mail to an energy source, such as a source of ultraviolet rays, to cause the phosphorescence and by detecting the phosphorescence a predetermined time after discontinuation of the exposure. Inasmuch as it is usual in automatic mail handling to feed the mail matter one after another through the handling system, the exposure of the mail and the subsequent phosphorescence detection are carried out at two locations spaced apart along the feed path. This requires a large distance between the two locations and is unreliable because of the inevitable fluctuation in the duration of afterglow of the predetermined color phosphorescence. Further to recognize tags having predetermined fluorescence capabilities, it is mandatory to provide a fluorescence detector in close proximity to the energy source. Recognition of the fluorescence not only requires such an additional detector but is difficult by nature because the energy, such as the visible rays, emitted from the exposure source might interfere with the fluorescence and thus confuse the fluorescence detector. In addition, it has been difficult with conventional devices to detect luminescent postage stamps placed on an envelope treated with a fluorescent bleaching agent. Conventional devices of the kind are described in Proceedings of the Institution of Mechanical Engineers, Volume 184 (1969–70), Part 3H, "British Postal Engineering," Paper 4, "Preparation, Properties and Application of Luminescent Organic Resins for Letter Facing, Classification and Address Coding," and Paper 41, "Letter Facing Machine."

SUMMARY OF THE INVENTION

It is therefore an object of the present invention to provide an electrooptical device for discriminating a pattern, capable of emitting predetermined color luminescence of either or both fluorescence and phosphorescence from other patterns.

It is another object to provide a device of the type which comprises a common detector for fluorescence and phosphorescence, and is accordingly compact.

It is still another object to provide a device of the type which is reliable.

It is yet another object to provide a device of the type which is capable of detecting fluorescence without being adversely affected by the energy source which has excited an article to fluorescence or by the fluorescent bleaching agent.

In accordance with the instant invention, an electrooptical device for discriminating a pattern, capable of emitting predetermined color luminescence, comprises first means for intermittently exposing a given pattern to energy for exciting the luminescence, if any. The fluorescence fully builds up during each period of the intermittent excitation and completely disappears within each intermission or interval between successive period of excitation. On the contrary, the phosphorescence does not substantially decay during the interval between successive excitations and is intensified during subsequent period of excitation. The device further comprises second means responsive to the predetermined color of the luminescence for producing a substantially intermittent and a substantially continuous signal when the given pattern is capable of emitting fluorescence and phosphorescence of the predetermined color, respectively. This serves the dual purpose to more reliably recognizing the pattern and to prevent the exciting energy, such as the visible rays accompanying the ultraviolet rays, from interfering with the subsequent detection of the luminescence. The device still further comprises third means for discriminating between the fluorescence and the phosphorescence based on the duration of the signal produced by the second means.

The second means comprises photoelectric means which comprises fliters, responsive to a set of colors, and photoelectric transducers. The set of colors should be such that a substantial portion of the rays of the predetermined color passes through at least one of the filters. The predetermined color may be given by a combination of so-to-say primary colors. For example, white may result from a particular color and its complementary color. Consequently, the colors to which the photoelectric transducers are made to respond will herein be called the color components. The second means further comprises a color detector responsive to the output signals of the photoelectric transducers for producing logical signals, which correspond to the color components and at least one combination of the color components and become the intermittent and continuous signals. These logical signals represent the duration of detected luminescence which has achieved a predetermined minimum intensity.

It should be remembered that the color as called herein includes white, gray, and black.

DESCRIPTION OF THE PREFERRED EMBODIMENTS

Figure 1:
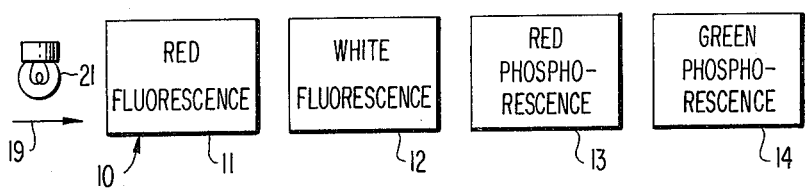
FIG. 1 schematically shows some luminescent color prints to be discriminated by a device according to the present invention.
Figure 5:
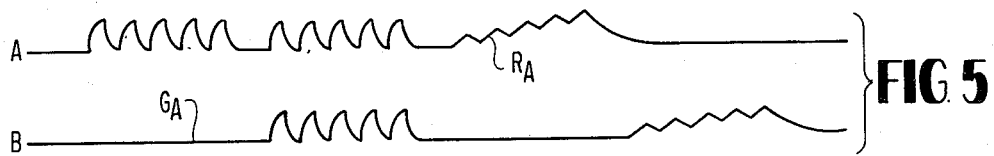
FIG. 5 shows the color analog signals derived from the phototubes included in the device shown in FIG. 2.
Figure 6:
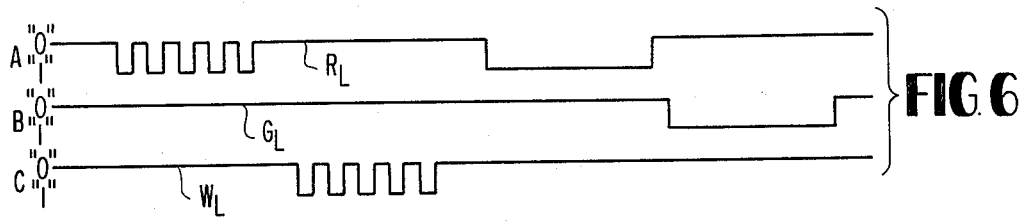
FIG. 6 shows the color logical signals produced by a color detector included in the device.
Figure 7:
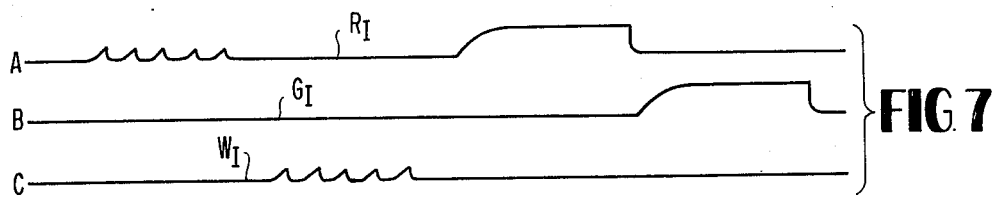
FIG. 7 illustrates the so-called integration signals appearing in a duration detector included in the device.
Figure 8:
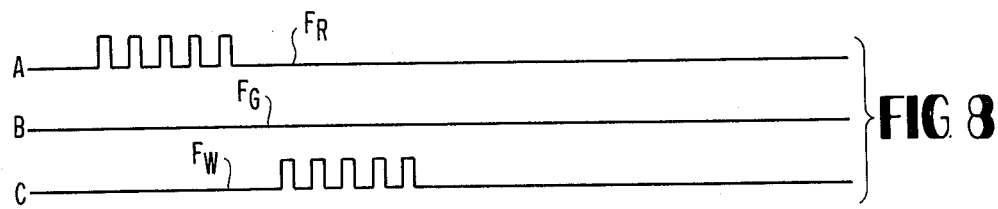
FIG. 8 shows the recognition signals representative of the fluorescence obtained from the duration detector.
Figure 9:
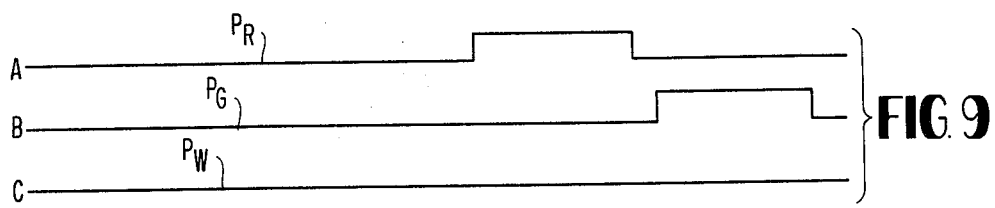
FIG. 9 shows the recognition signals representative of the phosphorescence.
Figure 2:
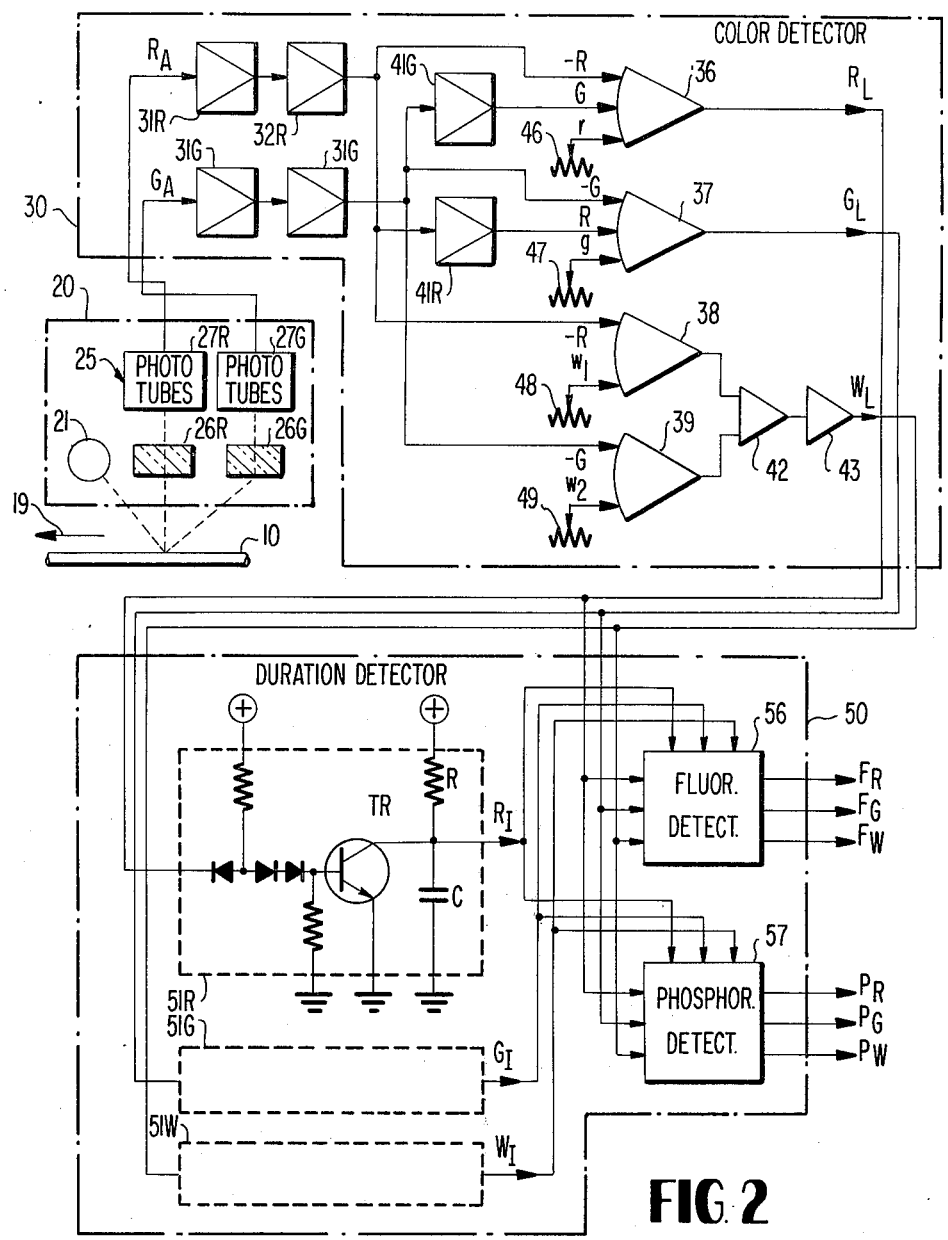
FIG. 2 is a block diagram of an embodiment of this invention.
Figure 3:
FIG. 3 illustrates the intermittent excitation used in this invention.
Figure 4:
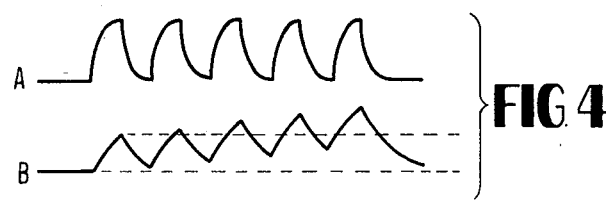
FIG. 4 schematically shows the luminescence produced by the intermittent excitation.

Referring to FIGS. 1 through 5, a plurality of luminescent color prints 10 such as the one shown in FIG. 2 are fed one by one into operative relationship with a device according to the present invention so that the color prints, 11, 12, 13 and 14 illustrated in FIG. 1 may be scanned by the device in the direction shown by an arrow 19. The device comprises unit 20 which includes a luminescence exciting energy source 21 and a detector head 25. It is assumed that the prints 11, 12, 13 and 14, when excited, emit red fluorescence, white fluorescence, red phosphorescence, and green phosphorescence, respectively, that the white color comprises the red and the green colors for simplicity of description, and that portions other than the prints 10 bear no luminescent coloring matter also for simplicity of description. The speed of the scan may be 3 m/sec. The energy source 21 may be an ultraviolet lamp and intermittently produces the exciting energy in the manner depicted in FIG. 3. The intermittent excitation may be carried out either by activating the source 21 by a high-frequency power supply or by intercepting the energy from the source by a rotating sector or similar device. The frequency and the duty ratio (i.e., ratio of on-time to off-time) of the intermittent excitation are such that the fluorescence sufficiently builds or charges up during each period of excitation and completely dies down during each period of non-excitation. The fluorescence caused by the intermittent excitation of FIG. 3 is illustrated in FIG. 4A. Further, the phosphorescence is neither fully excited in each period of excitation nor completely diminished in each excitation devoid interval and consequently builds up towards saturation during the continuation of the intermittent excitation as exemplified in FIG. 4B. The frequency and the duty ratio are determined in light of the duration of the luminescence, the dimensions of the color prints 10, the relative speed of scan, and the like. As an example, if the minimum dimension of the print 10 in the direction of the scan is 7 mm and the print is to be subjected to the excitation twice, the frequency should be about 0.86 kHz. Inasmuch as the build up time of luminescence is generally a little shorter than but proportional to the decay time, the duty ratio may be 1:1.

The luminescence is detected by the detector head 25. Since a finite time is required to produce luminescence in response to excitation, the excitation source 21 is preferably directed to an area of the color prints 10 which will subsequently come into view of the luminescence detector. The detector head 25 comprises color filters, such as a red and a green filter 26R and 26G, respectively, accompanied by photoelectric transducers, such as phototubes 27R and 27G for the red and the green rays, respectively. It is desirable that an optical system (not shown) be provided between the path of the prints 10 and the detector head 25 to direct preferably equally divided portions of the luminescence to the filters 26R and 26G. The color analog electric signals $R_A$ and $G_A$ produced by the phototubes 27R and 27G are illustrated in FIGS. 5A and 5B, respectively.

Referring to FIGS. 1, 2, 5 and 6, the color analog signals $R_A$ and $G_A$ are delivered to a color detector 30 which may be that disclosed in Japanese Patent application No. Syo 45-37245 filed Apr. 30, 1970, and referred to and described in copending U.S. Patent application Ser. No. 205,666 of Shoichiro Yoshimura, Rinzou Ebukuro and Tomoyuki Isono and assigned to the same assignee as the present invention, filed Dec. 7, 1971, now U.S. Pat. No. 3,745,527, issued July 10, 1973. Inasmuch as only one set of complementary colors are used in the embodiment being described, the color detector 30 operates to indicate the luminescence as being red when the red signal $R_A$ is larger than a predetermined level and the green signal $G_A$ is smaller than a preselected level, to indicate the luminescence as being green when the situation is reversed, and to indicate the luminescence as being white when both red and green analog signals $R_A$ and $G_A$ are larger than the respective prescribed levels. Preferably, the color detector 30 comprises a pair of preamplifiers 31R and 31G for impedance transformation, a pair of main amplifiers 32R and 32G for deriving sign-inverted normalized analog color signals $-R$ and $-G$, respectively, and a plurality of adder/comparators 36, 37, 38 and 39. In the presence of $R_A$ or $G_A$ signals caused by the respective luminescence, the corresponding one of the preamplifiers 31R and 31G produces an output signal of a very low level, such as $+0.5V$. The main amplifiers 32R and 32G amplify the output signals of the respective preamplifiers 31R and 31G by a factor of some $-20$ (the minus sign representing polarity inversion) to produce the sign-inverted normalized analog color signals $-R$ and $-G$ which are of sufficient levels, such as $-10V$, for their subsequent use and which are of the equal or normalized level in case the rays of the red and the green components provide white rays when superimposed on each other. The amplifiers 41G and 41R are sign inverting amplifiers having an amplification factor of about one. The circuitry for deriving the normalized color analog signals $-R$, $-G$, R and G from the color analog electric signals $R_A$ and $G_A$ may be called the normalizing circuits. Supplied with the sign-inverted normalized red signal $-R$, the normalized green signal G, and a first reference or allowance electric signal $r$, the adder/comparator 36 calculates the sum of $-R$, G, and $r$ and produces a red logical signal $R_L$ which assumes the logical values 1 or 0 if the sum is negative or positive, respectively. In other words if $-R$ is greater than G by an amount exceeding the reference $r$, the output is a logic 1 representing the detection of red luminescence. Supplied with the sign-inverted normalized green signal $-G$, the normalized red signal R and a second allowance electric signal $g$, the adder/comparator 37 similarly produces a green logical signal $G_L$ which assumes the logical levels 1 or 0 if the algebraic sum of $-G$, $R$, and $g$ is negative or positive, respectively. With the sign-inverted red signal $-R$ and a third allowance signal $w_1$, the adder/comparator 38 produces a red-component logic electric signal which assumes the logical levels 1 or 0 if the sum of $-R$ and $W_1$ is negative or positive, respectively. With the sign-inverted green signal $-G$ and a fourth allowance signal $w_2$, the adder/comparator 39 produces a green-component logical signal which assumes the logical values 1 or 0 if the sum of $-G$ and $w_2$ is negative or positive, respectively. The red-component and the green-component logical signals are supplied to a two-input NAND circuit 42 and then to an inverter circuit 43, whose output is a white logical signal $W_L$ which assumes the logical values 1 or 0 if the luminescence being detected is or is not, respectively, of a white color comprising the red and the green components. The allowance signals $r$, $g$, $w_1$, and $w_2$ may be provided by adjustable potentiometers 46, 47, 48 and 49, respectively, symbolically depicted in FIG. 2. These signals provide allowance for the respective colors as will readily be understood when a two-dimensional color chart is drawn for reference purposes. In other words, each allowance signal determines the intensity level for distinguishing between presence and absence of the color component being investigated. The third and the fourth allowance signals $w_1$ and $w_2$ may be equal to the first and the second allowance signals $r$ and $g$, respectively. Alternatively, all allowance signals $r$, $g$, $w_1$ and $w_2$ may be equal to each other. In any event, a color analog signal produced in response to fluorescence and phosphorescence results in color logical signals which assume the form of a substantially intermittent and a substantially continuous electric signal when the luminescence appears as fluorescence and the phosphorescence of the predetermined color, respectively. In FIGS. 6A, 6B, and 6C, the color logical signals $R_L$, $G_L$ and $W_L$ are illustrated with the logical values 1 and 0 represented by the lower and the higher levels, respectively. This convention is selected to aid in the description of the later stages of the embodiment of this invention. Note that the red fluorescence in FIG. 5A results in a series of logic 1 on the $R_L$ output shown in FIG. 6A, whereas the red phosphorescence in FIG. 5A results in a continuous logic 1 on the $R_L$ output, also shown in FIG. 6A.

Figure 10:
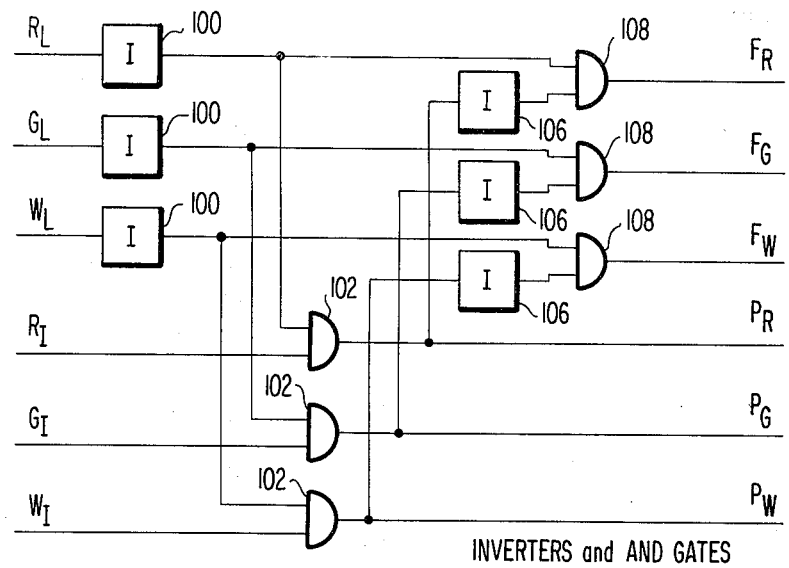
FIG. 10 is a logic diagram of a first implementation of the fluorescent and phosphorescent detectors 56, 57 shown in FIG. 2.

Referring to FIGS. 1, 2 and 6 through 9, the color logical signals $R_L$, $G_L$ and $W_L$ are delivered to a duration detector 50 for measuring the duration of the logical signals. The purpose of the duration detector is to aid in the discrimination between fluorescence and phosphorescence and between luminescence of the predetermined colors having preselected minimum intensities and durations from interfering luminescence which may be of the predetermined color and intensity but not of a preselected duration which would indicate that it was not produced by a pattern which is to be recognized. Without the duration detector, short duration spurious luminesence, produced from the area surrounding the pattern being investigated and having sufficient intensity to pass through the color detector, might cause an incorrect recognition to take place. Preferably, the detector 50 comprises identical integrators 51R, 51G and 51W for the respective color logical signals. The integrator 51R, for example, comprises a transistor TR with associated resistors, diodes, capacitors and power supplies, including resistor R and capacitor C. The value of resistor R is substantially greater than the saturation resistance $R_{sat}$ of transistor TR. Thus, capacitor C charges through R slower than it discharges through TR. When the input to integrator 51R is a logic 0, i.e., high level, TR is on, C is discharged and the output $R_I$ is at a low level. When the input goes to logic 1, TR turns off, C begins charging slowly through R and the output $R_I$ begins rising. Consequently, intermittent logical 1 signals at the input result in a first integration electric signal having a substantially sawtooth-like waveform of small amplitude. On the other hand, the continuous logical 1 signal results in a second integration electric signal having a growing and then saturating amplitude, which rapidly falls to zero when the continuous logical 1 signal disappears. The derived integration signals $R_I$, $G_I$ and $W_I$ therefore vary in the manner depicted in FIGS. 7A, 7B and 7C, respectively. The integrators 51R, 51G and 51W illustrated are particularly suitable for use with this invention in that they aid in blocking any output signals during the excitation energy devoid interval when the input logical signals, such as $R_L$, $G_L$ and $W_L$ are produced by fluorescence. The integration signals $R_I$, $G_I$ and $W_I$ are supplied to a fluorescence and a phosphorescence detector 56 and 57 together with the logical signals $R_L$, $G_L$ and $W_L$. The fluorescence detector 56 comprises logical circuits for letting the logical signals $R_L$, $G_L$ and $W_L$ pass therethrough to become the red, the green, and the white fluorescence recognition or detection signals $F_R$, $F_G$ and $F_W$ shown in FIGS. 8A, 8B and 8C, respectively, when the corresponding integration signals $R_I$, $G_I$ and $W_I$ are above a first predetermined level but below a second predetermined level. The phosphorescence detector 57 comprises logical circuits for allowing the logical signals $R_L$, $G_L$ and $W_L$ to pass therethrough to become the red, the green, and the white phosphorescence recognition signals $P_R$, $P_G$ and $P_W$ depicted in FIGS. 9A, 9B and 9C, respectively, when the corresponding integration signals $R_I$, $G_I$ and $W_I$ are higher than the second predetermined level. For simplicity, the logic circuits 56 and 57 may be inverters and AND gates such as shown in combination in FIG. 10. In order to make the continuous logic signals $R_L$, $G_L$ and $W_L$ become the phosphorescence recognition signals $P_R$, $P_G$, $P_W$, respectively, it will readily be seen that coincidence should be detected between the logic signal of a color and the corresponding integration signal $R_I$, $G_I$, or $W_I$. In view of the fact that the low level depicted in FIG. 6 for $R_L$, $G_L$ and $W_L$ indicates the logic 1 signal, the logic signals $R_L$, $G_L$ and $W_L$ are polarity inverted by the respective inverters 100 and then supplied to the respective AND gates 102 together with the corresponding integration signals $R_I$, $G_I$ and $W_I$. In this connection, it is to be noted that the integration signals $R_I$, $G_I$ and $W_I$ produced in response to the phosphorescence is of sufficient amplitude to serve as logic 1 signals at the AND circuits 102.

Figure 11:
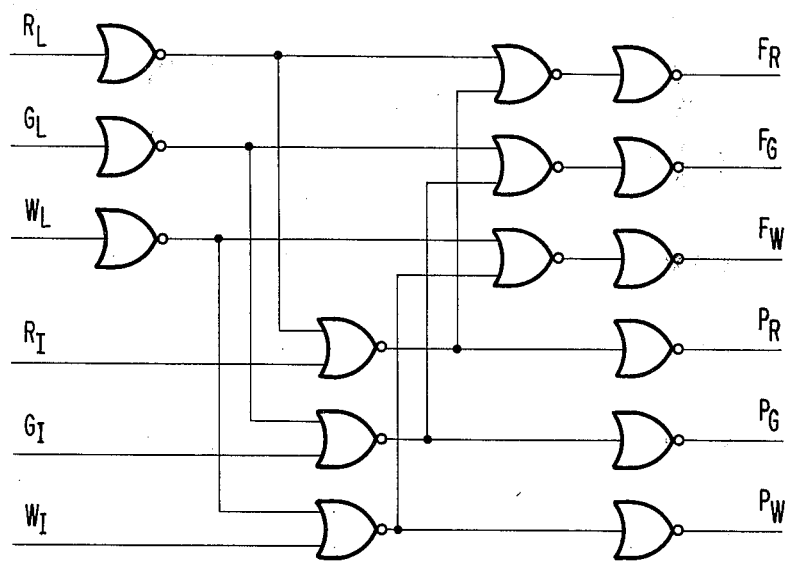
FIG. 11 is a logic diagram of a second implementation.

In the case of fluorescence, the signals $R_I$, $G_I$ and $W_I$ will be too small to represent logic 1 signals. Consequently, the outputs of AND circuits 102 will all be logic 0. The latter are inverted by respective inverter circuits 106 and applied as logic 1 imputs to respective AND circuits 108. Consequently, a logic 1 output from any one of the gates 108 indicates a fluorescent detection. It will be noted that in the embodiment of FIG. 10, except for the input $R_L$, $G_L$ and $W_L$ signals, a logic 1 designated a high signal output. An alternative implementation of circuits 56, 56 uses NAND logic and is shown in FIG. 11.

It is also possible to separate the luminescence into three or more color components. This enables discrimination of prints capable of emitting various luminescent colors. Instead of integrators 51R, 51G and 51W, the duration detector 50 may comprise means for calculating the pulses which appear in a predetermined time after the build up of the logical signal, such as $R_L$, $G_L$ or $W_L$.

As can be seen from the above, it is the intermission or interval between the exposure or excitation which is of interest to the instant invention and the periods of exposure are not serious. The device is also applicable to discrimination between phosphorescence having different periods of afterglow with the intermission of the exposure varied accordingly. It should be noted in this connection that fluorescence is the luminescence having very short duration of afterglow. The invention is further applicable to discrimination of patterns exhibiting color change of the luminescence after discontinuation of the exposure. In addition, it is possible with this invention to discriminate patterns capable of producing luminescence of the predetermined colors from non-luminescent patterns. In this regard, the luminescence of a predetermined color as called herein may be the rays emitted or reflected by non-luminescent patterns.

What is claimed is:

1. An electro-optical detection device which is capable of discriminating between a plurality of patterns having different luminescent materials thereon, each luminescent material, when excited, emitting luminescence whose color is identical to one of a plurality of predetermined colors and whose persistence characteristic is such that it will decay to zero luminescence in less than or longer than a predetermined time, comprising:

a plusating radiation source for directing radiation upon said patterns to excite said luminescent materials thereon for luminescence, said radiation having a predetermined pulse frequency with its "off" period of each cycle equal to said predetermined time;

photosensitive detector means responsive to the luminescence from said luminescent materials for generating first electric signals proportional to the intensities of predetermined color components of which each of said predetermined colors is composed;

color detecting means responsive to said first electric signals for generating second electric signals indicative of the presence of said predetermined colors in the luminescence from said luminescent materials;

duration distinguishing means responsive to said second electric signals for generating third electric signals indicative of whether the luminescence from said luminescent materials has a decay time less than or longer than said predetermined time; and recognition means responsive to said second and third electric signals for recognizing said plurality of patterns.

2. The device of claim 1 wherein said color detector comprises:

amplifier means responsive to said first electric signals for producing normalized analog electric signals, potentiometer means for adjustably producing allowance electric signals indicative of at least one amount predetermined in conjunction with every one of said color components, and adder/comparator means responsive to said normalized electric signals and said allowance electric signals for producing said second electric signals when the algebraic sum of the concerned normalized electric signals and the concerned allowance is of a predetermined polarity.

3. The device of claim 1 wherein said duration distinguishing means comprises:

integrator means for integrating said second electric signals, said integrator means producing at its output an intermittent signal not reaching a predetermined level when the luminescence from said luminescent materials has a decay time less than said predetermined time and a substantially continuous signal reaching said predetermined level when the luminescence from said luminescent materials has a decay time longer than said predetermined time.

4. The device of claim 1 wherein said duration distinguishing means comprises:

logic gate means for passing said second and third electric signals therethrough upon coincidence of said signals.

* * * * *

UNITED STATES PATENT AND TRADEMARK OFFICE
CERTIFICATE OF CORRECTION

PATENT NO. : 3,904,872
DATED : September 9, 1975
INVENTOR(S) : Rinzou Ebukuro; Tomoyuki Isono; Tetsuo Omiya It is certified that error appears in the above–identified patent and that said Letters Patent are hereby corrected as shown below:

Column 2, line 39, delete [fliters] and insert --- filters ---

Column 4, line 64, delete [ -R ] and insert --- $|-R|$ -----

Column 4, line 63, delete [ G ] and insert --- $|G|$ ----

Column 5, line 7, delete [$W_1$] and insert --- $w_1$ ----

Column 6, line 63, delete [imputs] and insert --- inputs ----

Signed and Sealed this twenty-fourth Day of February 1976

[SEAL]

Attest:

RUTH C. MASON
*Attesting Officer*

C. MARSHALL DANN
*Commissioner of Patents and Trademarks*